United States Patent
Beeson et al.

(10) Patent No.: US 10,764,618 B1
(45) Date of Patent: Sep. 1, 2020

(54) SYSTEM, METHOD AND ARTICLE OF MANUFACTURE FOR AUTOMATIC DETECTION AND STORAGE/ARCHIVAL OF NETWORK VIDEO IN A VIDEO-ON-DEMAND SCENARIO

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: CONCURRENT VENTURES, LLC, Johns Creek, GA (US)

( * ) Notice: Subject to any disclaimer, the term of this patent is extended or adjusted under 35 U.S.C. 154(b) by 0 days.

(21) Appl. No.: 14/099,837

(22) Filed: Dec. 6, 2013

(51) Int. Cl.
*H04N 21/24* (2011.01)
*H04N 21/442* (2011.01)
*H04N 21/81* (2011.01)

(52) U.S. Cl.
CPC ....... *H04N 21/2407* (2013.01); *H04N 21/442* (2013.01); *H04N 21/812* (2013.01)

(58) Field of Classification Search
CPC ........... H04N 21/4122; H04N 21/2187; H04N 21/2547; H04N 21/25883; H04N 21/6437; H04N 21/25816; H04N 21/4331; H04N 21/2323; H04N 21/23109; H04N 21/2668; H04N 21/4826; H04N 21/26283; H04N 21/4753; H04N 21/4661; H04N 21/4828; H04N 21/478; H04N 21/4884; H04N 21/472; H04N 21/4108; H04N 21/42204; H04N 21/43615; H04N 21/431; H04N 21/42207; H04N 21/2383; H04N 21/4532; H04N 21/26241; H04N 21/258; H04N 21/482; H04N 21/23439; H04N 21/2143; H04N 21/2662; H04N 21/2407; H04N 21/442; H04N 21/812
USPC ........ 725/14, 5, 46, 35, 9, 108, 34, 109, 13, 725/22, 93, 32, 51, 37, 86, 115, 18, 134, 725/54, 25, 105, 111, 87, 78, 91, 52, 119, 725/47, 81, 44, 114, 133, 112, 116; 709/233; 702/14; 348/722; 370/229; 726/11

See application file for complete search history.

(56) References Cited

U.S. PATENT DOCUMENTS

| | | | | |
|---|---|---|---|---|
| 5,715,018 | A * | 2/1998 | Fasciano et al. | ............. 348/722 |
| 8,068,986 | B1 * | 11/2011 | Shahbazi | .............. H04L 63/126 342/28 |
| 2005/0047333 | A1 * | 3/2005 | Todd et al. | .................... 370/229 |
| 2006/0136575 | A1 * | 6/2006 | Payne | ................ G07C 9/00087 709/219 |
| 2007/0033364 | A1 * | 2/2007 | Maeda | .................. G06F 3/0613 711/170 |
| 2007/0261112 | A1 * | 11/2007 | Todd et al. | ...................... 726/11 |
| 2008/0240490 | A1 * | 10/2008 | Finkelstein | .......... H04N 21/235 382/100 |
| 2013/0018995 | A1 * | 1/2013 | Sansom | .............. G06F 17/3082 709/220 |

(Continued)

*Primary Examiner* — Sumaiya A Chowdhury
(74) *Attorney, Agent, or Firm* — Womble Bond Dickinson (US) LLP

(57) ABSTRACT

A storage controller controls a plurality of storage media devices and a network interface passively monitors network traffic and automatically detects video data in at least a portion of said network traffic, where the storage controller archives the video data in the storage media devices and processes the archived video data to serve the archived video data as video-on-demand data.

16 Claims, 4 Drawing Sheets

(56) References Cited

U.S. PATENT DOCUMENTS

2014/0122676 A1\* 5/2014 Tsao .............................. 709/223

\* cited by examiner

SYSTEM, METHOD AND ARTICLE OF MANUFACTURE FOR AUTOMATIC DETECTION AND STORAGE/ARCHIVAL OF NETWORK VIDEO IN A VIDEO-ON-DEMAND SCENARIO

BACKGROUND OF THE INVENTION

Field of Invention

The present invention relates generally to the field of data storage. More specifically, the present invention is related to a system, method and an article of manufacture for auto-detection and storage/archival of network video in a video-on-demand scenario.

Discussion of Related Art

The prior art is replete with examples of storage devices that are part of a network. For example, it is well known in the art to have storage devices that are part of a storage area network (SAN) and it is well known in the art to have network attached storage (NAS) devices as part of a local area network (LAN), or even the wide area network (WAN), such as the Internet. However, such prior art storage systems do not provide for automatic detection and storage/archival of network video, particularly, in a video-on-demand scenario.

Embodiments of the present invention are an improvement over prior art systems and methods.

SUMMARY OF THE INVENTION

In another embodiment, the present invention provides for a system comprising: a plurality of storage media devices; a storage controller controlling the plurality of storage media devices; a network interface passively monitoring network traffic and automatically detecting video data in at least a portion of the network traffic; the storage controller archiving the video data in the storage media devices, and processing the archived video data to serve the archived video data as video-on-demand data.

In another embodiment, the present invention provides for a non-transitory, computer accessible memory medium storing program instructions for archiving video data in a plurality of storage media devices, wherein the program instructions are executable by a processing element in a storage system to: passively monitor network traffic; automatically detect video data in at least a portion of the network traffic; archive the video data in the storage media devices; and process the archived video data to serve the archived video data as video-on-demand data.

In another embodiment, the present invention provides for a non-transitory, computer accessible memory medium storing program instructions for passively creating a video-on-demand library, wherein the program instructions are executable by a processing element in a storage system to: passively monitor network traffic originating at a broadcast source; automatically detect video data from the broadcast source in at least a portion of the monitored network traffic; storing the detected video data in the storage system; and creating a video-on-demand library from the stored video data.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
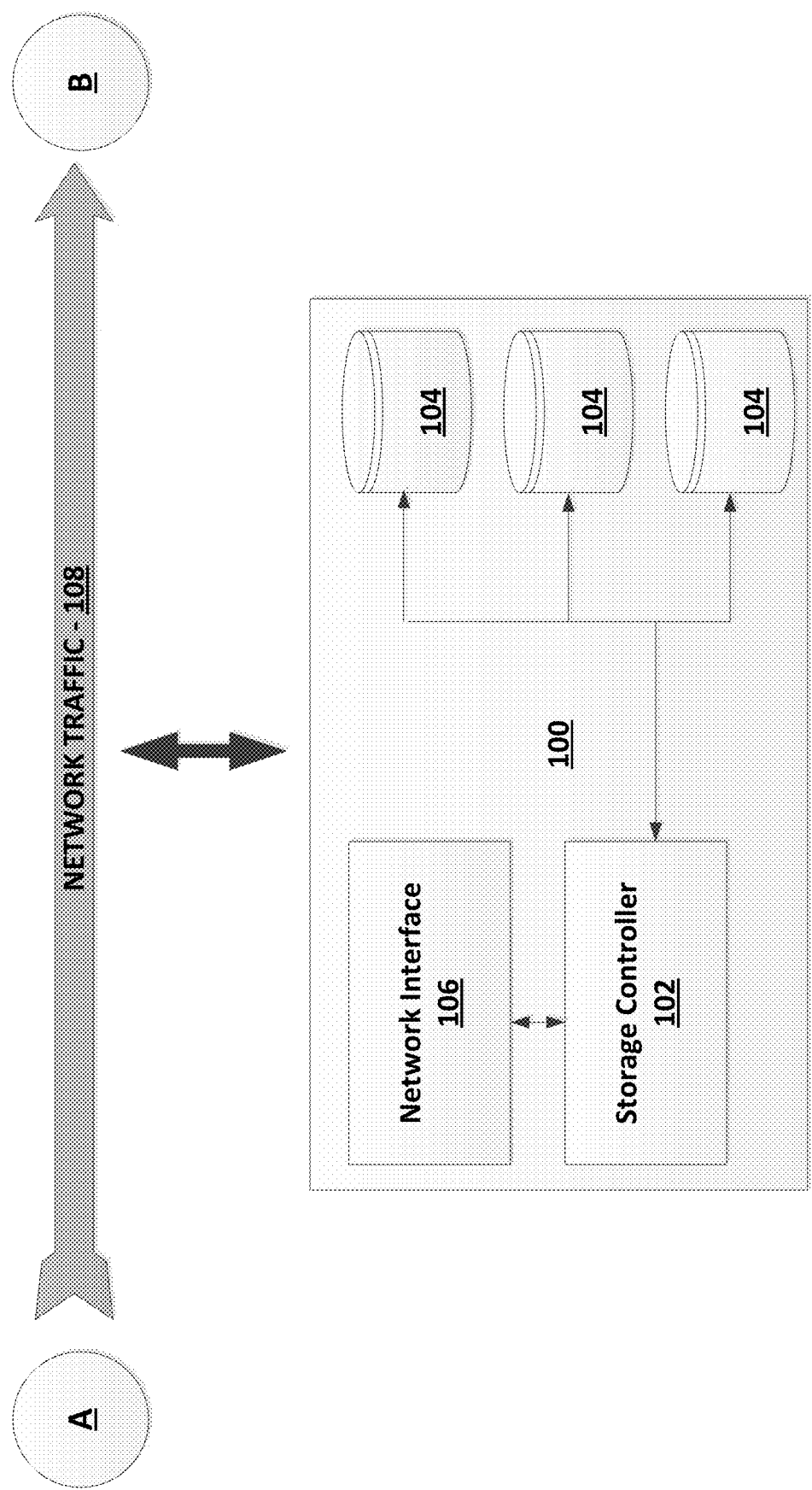
FIG. 1 and FIG. 2 illustrate system diagrams associated with various embodiments associated with the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention contemplates a storage system with the ability to passively watch a network, identify video traffic, and automatically configure itself to store this video traffic. Passive monitoring watches existing traffic flow on a network to deduce a great deal of information about such traffic flow and the data it carries. Such deduced information may then be used to automate decisions regarding the traffic. The present invention further contemplates a storage system with the ability to passively watch a network, identify video traffic, and automatically configure itself to store this video traffic based on the content of the video traffic. For example, the video traffic may be automatically stored by the storage system when one or more image recognition algorithms detect one or more product or manufacturer logos present in the video traffic content. The video traffic may also be automatically stored by the storage system when motion is detected or when motion is not detected in the video traffic content. Such motion detection may view the entire video picture or subsets thereof (i.e. one or more regions within the video picture). The video traffic may be passing from point A to point B (where the storage system is not the destination but otherwise has network visibility to the traffic), may be directed to the storage system, or may be directed to the "bit bucket" (a destination that does not exist).

The system may follow a set of rules to define how much of the video to store, how to name the files/objects, how stored video data should be tiered (pushing low frequency of use video to archive or slower storage systems or pushing high frequency of use video data to faster storage systems, such as solid-state storage media devices), etc. A file or object refers to constant-sized or variable-sized collections of data that have the same name or reference. The storage system may be configured on the fly or configured in advance. Also, in instances where such a video stream stops for a pre-determined period of time, the corresponding file may be closed, and should another video stream return, another file may be opened for writing/storage.

The names of the files may also be auto generated based on some combination of rules, date-time, camera address, metadata provided by a source, etc. The storage system may also allow for rolling or circular storage, such as a storing the last 4 hours of video, etc. It is also envisioned in a separate embodiment that the camera may control the length of capture/storage. For example, in a camera that supports motion-based capture or intrusion-detection-based capture, the camera may already be programmed to stream an event-based video segment for a time period following such detection or intrusion. In these instances, the present invention's storage system automatically captures such event-based video segments.

In one embodiment, as shown in FIG. 1, the present invention provides for a system 100 comprising: a plurality of storage media devices 104; one or more storage controllers 102 controlling the plurality of storage media devices 104; one or more network interfaces 106 passively monitoring network traffic 108 and automatically detecting video data in at least a portion of the network traffic; and a storage controller 102 storing the video data in the storage media devices. It should be noted that there may be other components in system 100, including one or more processing elements RAM, ROM, etc. It should also be noted that there may be other components in storage controller 102, including one or more processing elements RAM, ROM, etc. The passive monitoring may be performed by the storage controller 102 or by other processing elements within system 100.

Figure 2:
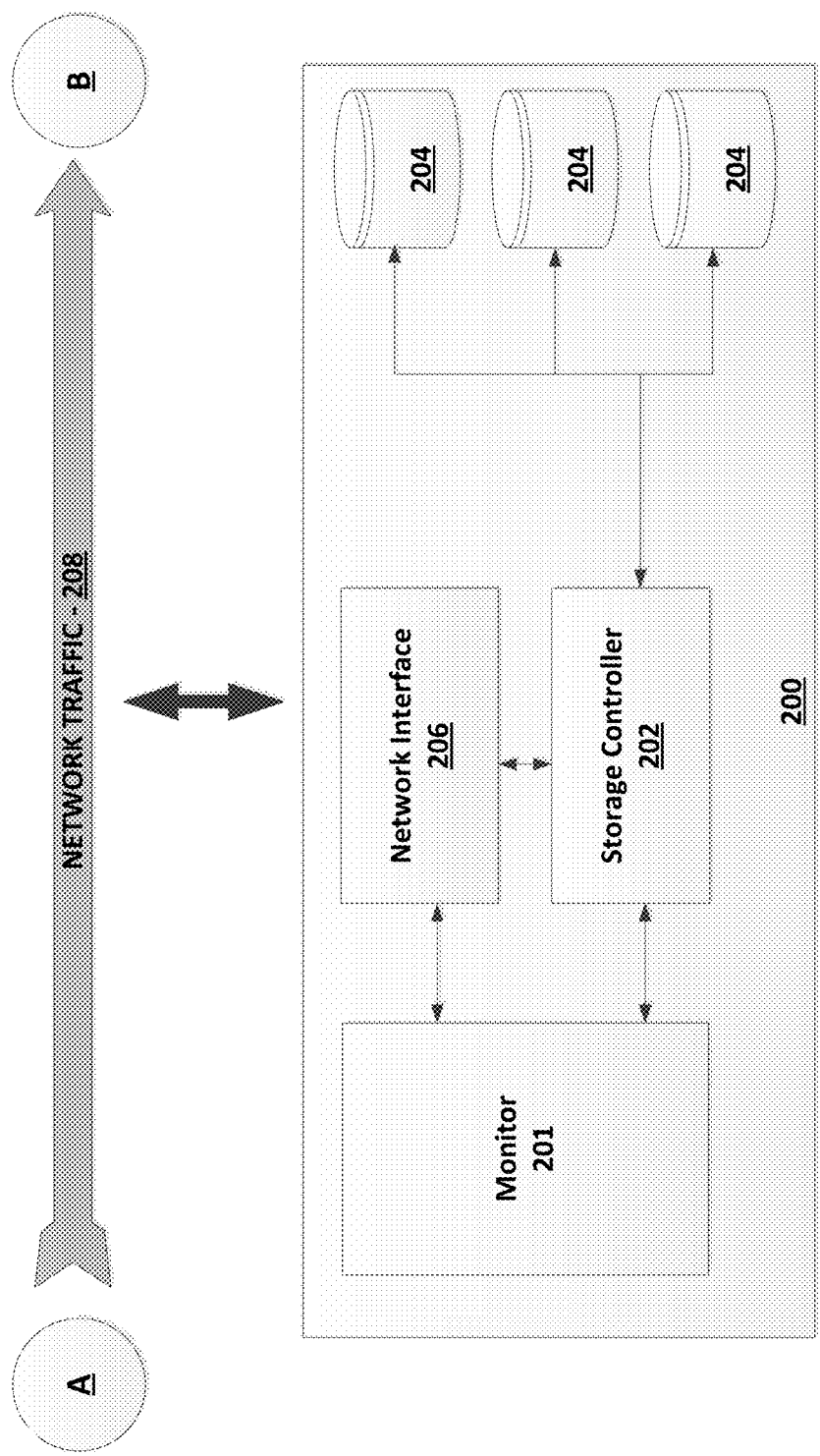

In another embodiment, as shown in FIG. 2, the present invention provides for a system 200 comprising: a plurality of storage media devices 204; one or more storage controllers 202 controlling the plurality of storage media devices 204; one or more network interfaces 206; and one or more monitors 201 passively monitoring network traffic 208 and automatically detecting video data in at least a portion of the network traffic; and a storage controller 202 storing the video data in the storage media devices. A monitor 201 may be performing a subset of the passive monitoring, each monitor 201 responsible for a different type of video data. Optionally storage controller 202 may also perform some of the passive monitoring. It should be noted that there may be other components in system 200, including one or more processing elements RAM, ROM, etc. It should also be noted that there may be other components in monitor 201, including one or more processing elements RAM, ROM, etc. Further, monitor 201 need not be collocated with the storage controller 202 and storage media devices 204 and may be implemented with a separate integrated circuit device and may be located within a separate physical enclosure.

In another embodiment, the present invention provides for a system comprising: a plurality of storage media devices; a storage controller controlling the plurality of storage media devices; a network interface passively monitoring network traffic and automatically detecting video data in at least a portion of the network traffic; the storage controller archiving the video data in the storage media devices, and processing the archived video data to serve the archived video data as video-on-demand data. The archived video data may then be indexed and a directory created to facilitate usage in a video-on-demand system, this processing is well known in the industry and is beyond the scope of this invention. While a system diagram is not provided for this embodiment, it is noted that this is done to avoid redundancy, as the system diagram would be similar to that of FIG. 1.

In yet another embodiment, the present invention provides for a system comprising: a plurality of storage media devices; a storage controller controlling the plurality of storage media devices; a network interface passively monitoring network traffic and automatically detecting video data in at least a portion of the network traffic; the storage controller storing the video data in the storage media devices, and processing the stored video data to serve the stored video data as video-on-demand data. The stored video data may then be indexed and a directory created to facilitate usage in a video-on-demand system, this processing is well known in the industry and is beyond the scope of this invention. As above, while a system diagram is not provided for this embodiment, it is noted that this is done to avoid redundancy, as the system diagram would be similar to that of FIG. 1.

Figure 3:
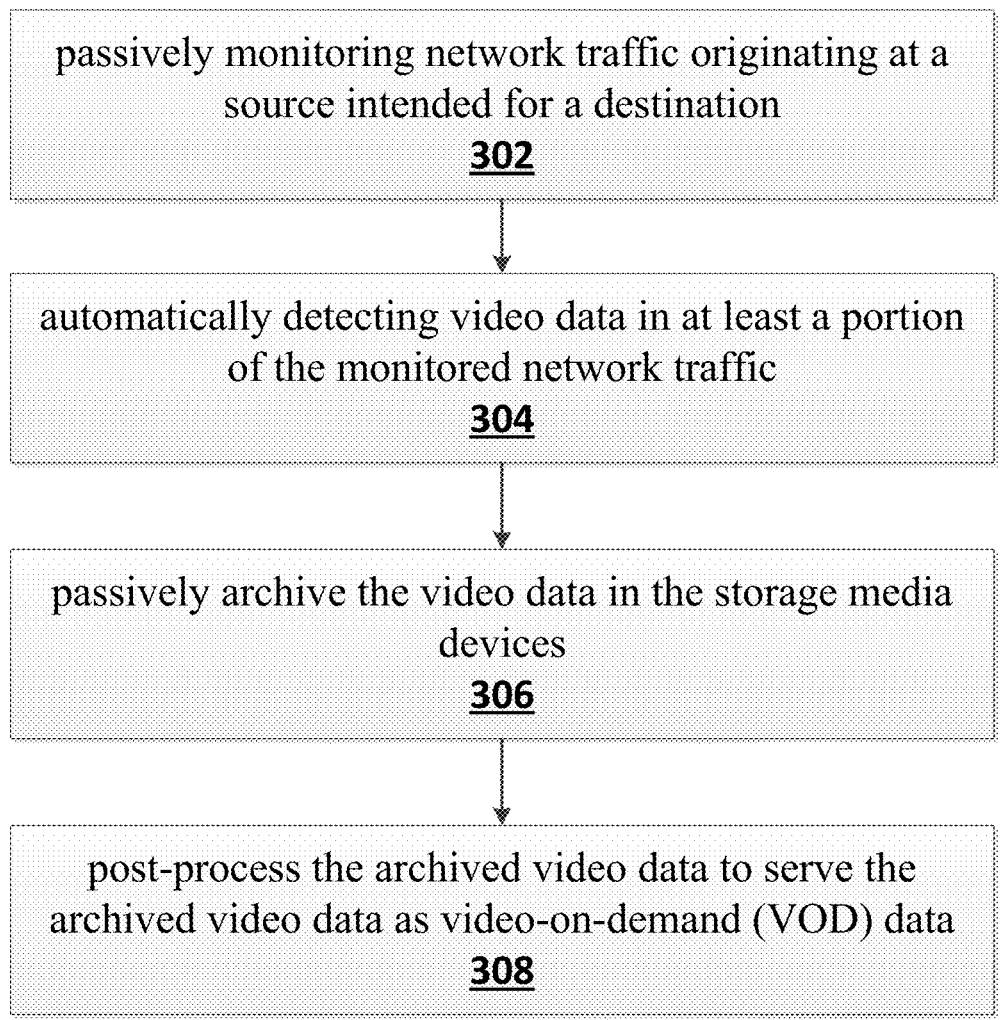
FIG. 3 and FIG. 4 illustrate examples of method flowcharts associated with the present invention.

In another embodiment, as shown in FIG. 3, the present invention provides for a non-transitory, computer accessible memory medium storing program instructions for archiving video data in a plurality of storage media devices, wherein the program instructions are executable by a processing element in a storage system to: passively monitor network traffic—step 302; automatically detect video data in at least a portion of the network traffic—step 304; archive the video data in the storage media devices—step 306; and process the archived video data to serve the archived video data as video-on-demand (VOD) data—step 308.

Figure 4:
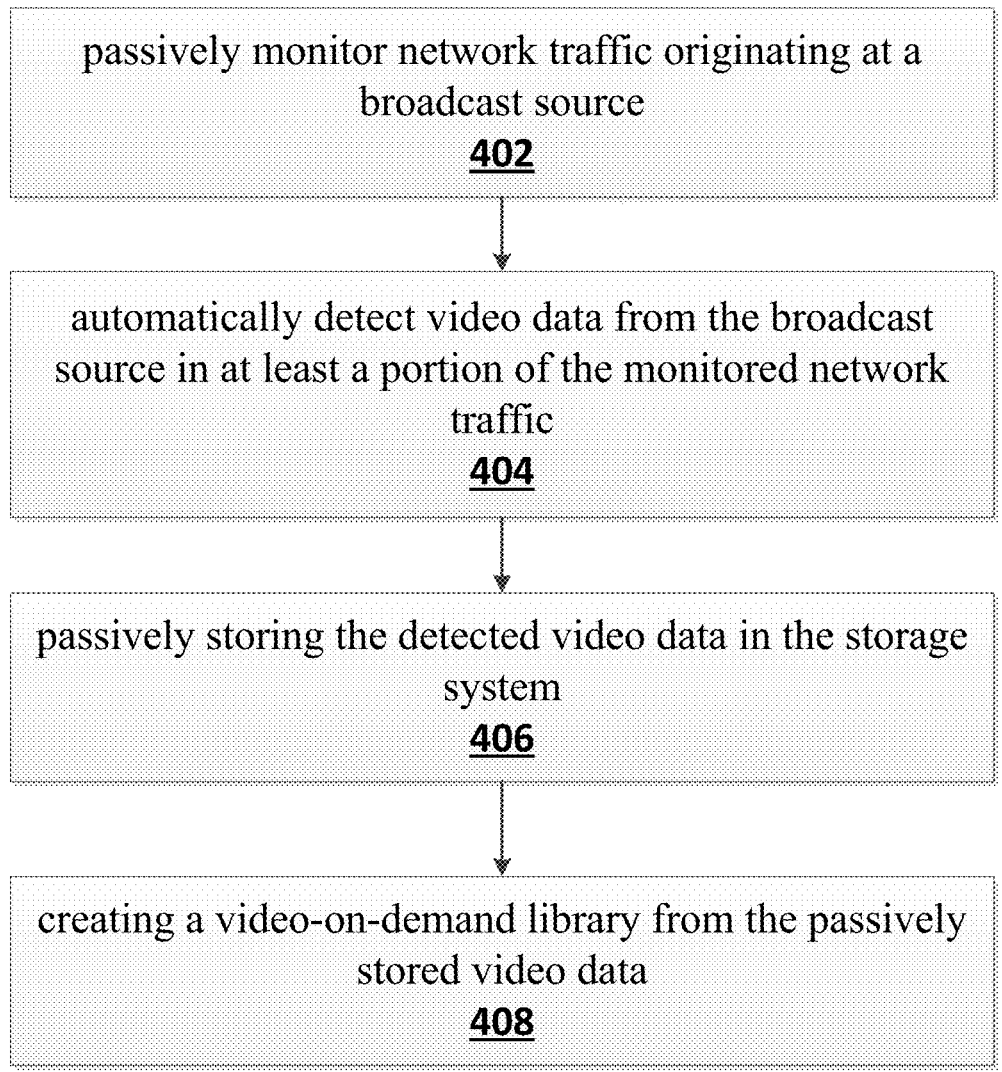

Another embodiment exists in storing broadcast and video on demand (VOD) video traffic within a service providers' network. The storage system simply needs to be connected to the network in such a way as to have access to the video traffic. This capability could be used to capture live broadcast feeds to create a VOD library. In this embodiment, as shown in FIG. 4, the present invention provides for a non-transitory, computer accessible memory medium storing program instructions for passively creating a video-on-demand library, wherein the program instructions are executable by a processing element in a storage system to: passively monitor network traffic originating at a broadcast source—step 402; automatically detect video data from the broadcast source in at least a portion of the monitored network traffic—step 404; storing the detected video data in the storage system—step 406; and creating a video-on-demand library from the stored video data—step 408.

It should be noted that while the specification refers to at least one storage controller, the teachings of the present invention equally applies to a plurality of storage controllers, including multiple, distributed, storage controllers. Also, while, for the sake of simplicity, the system is described as being within a chassis, it should be noted that the entire system need not be co-located within one chassis or physical location, as one or more individual elements may be located as part of a different chassis/location. Additionally, the system may also have parent and child storage controllers, where a parent storage controller makes decisions to balance across child storage controllers, who may then make decisions to balance across their child storage controllers, etc. (eventually hitting storage media devices connected to last storage controller(s) in the chain. As a non-limiting example, a storage controller may balance load across a box comprising a plurality of storage media devices, where a master storage controller may be connected to a plurality of such storage controllers to perform load balancing across a plurality of such boxes, each having a plurality of storage media devices.

The above-described features and applications can be implemented as software processes that are specified as a set of instructions recorded on a computer readable storage medium (also referred to as computer readable medium). When these instructions are executed by one or more processing element(s) (e.g., one or more processors, cores of processors, or other processing elements), they cause the processing element(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing element and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on/within the circuit itself. In some implementations, such as with FPGAs, software may be used to describe hardware circuits, an example of which are FPGA programming files. Such FPGA programming files may also include computer programs, machine code, microcode, firmware, and other software. The FPGA programming files may be stored within an FPGA, ASIC, computer-readable storage media, machine-readable media, or machine-readable storage media.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Those of skill in the art will appreciate that other embodiments of the disclosure may be practiced in network computing environments with many types of computer system configurations, including personal computers, hand-held devices, multi-processor systems, ASIC-based systems, FPGA-based systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of a system, method and an article of manufacture for network video auto-detection and storage/archival in a video-on-demand scenario. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A system comprising:
a plurality of storage media devices;
a storage controller controlling said plurality of storage media devices; and
a network interface passively monitoring network traffic and automatically detecting video data in at least a portion of said network traffic wherein said network interface generates data upon which an automated configuration of the system is executed based upon video content of the detected video data;
said storage controller to automatically configure itself, based on detecting a product or manufacturer logo in the video content of the detected video data from the passively monitored network traffic, to archive said video data in said storage media devices, and process said archived video data to serve said archived video data as video-on-demand data.

2. The system of claim 1, wherein said archived data is used in content verification.

3. The system of claim 2, wherein said content verification is advertisement insertion verification.

4. The system of claim 1, wherein said video data is archived as one or more objects, with name of said one or more objects based on any of, or a combination of, the following: one or more naming rules, date, time, camera network address, or camera name.

5. The system of claim 1, wherein said storage controller passively monitors and archives said video data for a pre-defined duration of time.

6. The system of claim 1, wherein said storage controller passively monitors and stores said video data for up to a pre-defined data size.

7. The system of claim 1, wherein said system is implemented as part of any of the following: storage area network (SAN) or network attached storage (NAS) device.

8. The system of claim 1, wherein the storage controller is further to automatically configure itself to automatically store video traffic in response to an image recognition algorithm detecting the product or manufacturer logo in the video traffic content.

9. The system of claim 1, wherein the storage controller is further to automatically configure itself to store a low frequency of use video to a first storage system and a high frequency of use video to a second storage system based on determining that the low frequency of use video is used less frequently than the high frequency of use video.

10. A non-transitory, computer accessible memory medium storing program instructions for archiving video data in a plurality of storage media devices, wherein the program instructions are executable by a processing element in a storage system to:
passively monitor network traffic;
automatically detect video data in at least a portion of said network traffic and based on video content of said automatically detected video generate data upon which an automated configuration of the storage system is executed;
automatically configure the storage system to archive said video data, based on detecting a product or manufacturer logo in the video content of the detected video data from the passively monitored network traffic;
archive said video data in said storage media devices; and
process said archived video data to serve said archived video data as video-on-demand data.

11. The non-transitory, computer accessible memory medium of claim 10, wherein said video data is archived as one or more objects, with name of said one or more objects based on any of, or a combination of, the following: one or naming rules, date, time, camera network address, or camera name.

12. The non-transitory, computer accessible memory medium of claim 10, wherein said video data is passively monitored and stored for a pre-defined duration of time.

13. The non-transitory, computer accessible memory medium of claim 10, wherein said video data is passively monitored and stored for up to a pre-defined data size.

14. The non-transitory, computer accessible memory medium of claim 10, wherein said plurality of storage media devices are implemented as part of a network attached storage (NAS) device.

15. A non-transitory, computer accessible memory medium storing program instructions for creating a video-on-demand library, wherein the program instructions are executable by a processing element in a storage system to:
passively monitor network traffic originating at a broadcast source;
automatically detect video data from said broadcast source in at least a portion of said monitored network traffic and based on video content of said automatically detected video generate data upon which an automated configuration of the storage system is executed;
automatically configure the storage system to archive said video data, based on detecting a product or manufacturer logo in the video content of the detected video data from the passively monitored network traffic;
storing said detected video data in said storage system; and
creating a video-on-demand library from said stored video data.

16. The non-transitory, computer accessible memory medium of claim 15, wherein said storage system is implemented as part of a network attached storage (NAS) device.

* * * * *